UNITED STATES PATENT OFFICE.

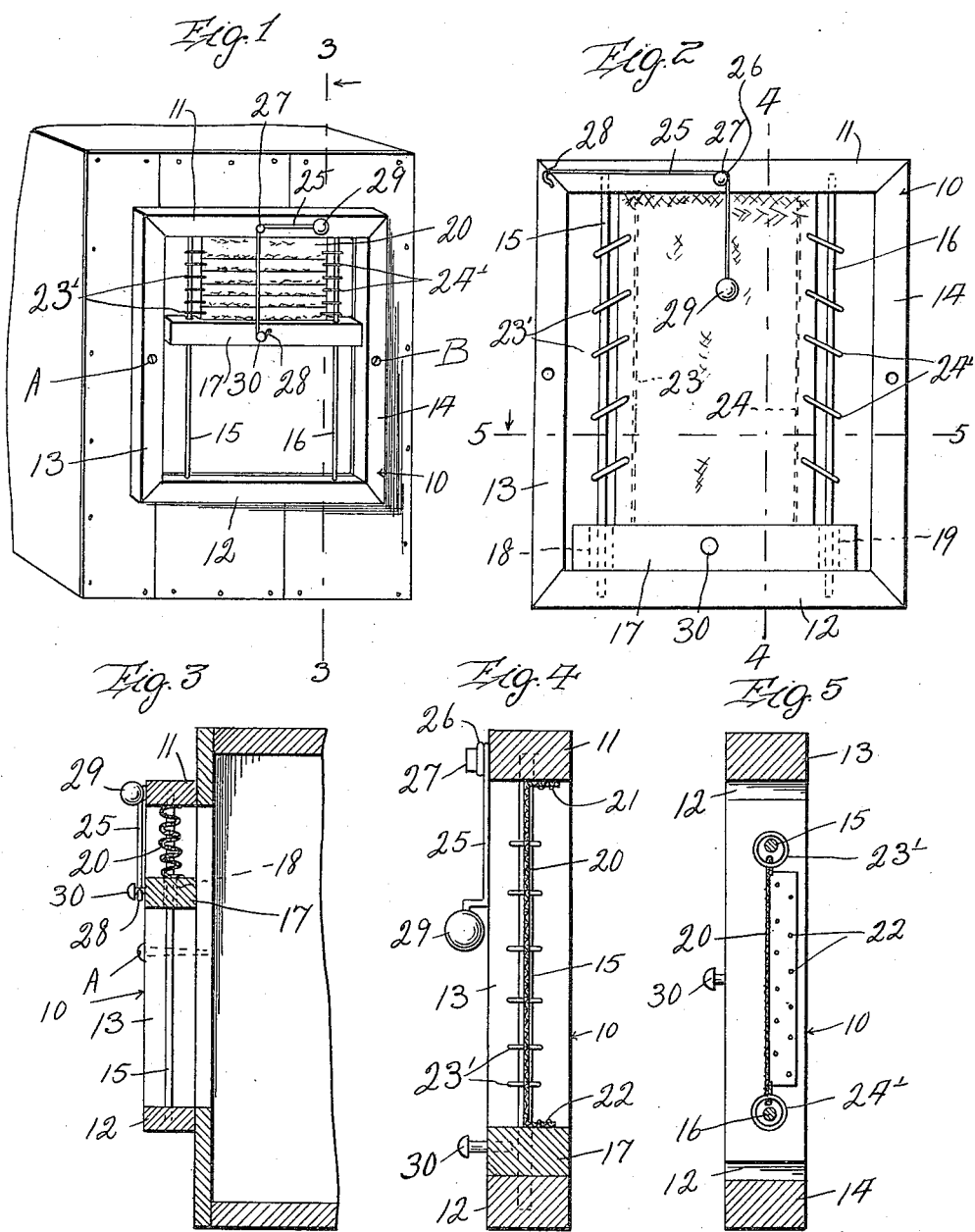

CHARLES LEWIS GRANT, OF MERCHANTVILLE, NEW JERSEY.

NEST-TRAP.

1,081,605.

Specification of Letters Patent.   Patented Dec. 16, 1913.

Application filed April 26, 1913.   Serial No. 763,864.

*To all whom it may concern:*

Be it known that I, CHARLES LEWIS GRANT, a citizen of the United States, residing at Merchantville, in the county of Camden and State of New Jersey, have invented certain new and useful improvements in Nest-Traps, of which the following is a specification, reference being had to the accompanying drawings.

This invention relates to trap nests and has for an object to provide a trap which may be applied to ordinary nest boxes in any preferred manner and which will be compact in form and capable of being manufactured at a minimum cost.

A further object is to provide a trap which will render it impossible for more than one hen to enter the nest at one time, and which furthermore will be so constructed that no large openings will exist through which an entrapped hen can thrust her head with resultant injury in an effort to escape or through which a hen outside of the nest can thrust her head to annoy the occupant of the nest.

A still further object is to provide a trap which will afford ample ventilation and which will admit a subdued light, thereby giving that sense of seclusion and privacy sought by all birds when they wish to lay.

A still further object is to provide a trap which will have no protruding projections against which a hen might fly with resultant injury, and which will be durable and formed of few and simple parts that will not be liable to get out of order. And a still further object of the invention is to provide a trap, the field of action of which will be confined within the limits of its own dimensions and which will not take up or occupy any space within the nest chamber when in action or at rest.

With the above objects in view, the invention consists of certain novel details of construction and combination of parts hereinafter fully described and claimed, it being understood that various modifications may be made in the minor details of construction within the scope of the appended claim.

In the accompanying drawing illustrating the invention:—Figure 1 is a perspective view illustrating how my improved nest trap may be attached to an ordianry box and showing the trap set or open to permit the entrance of a hen. Fig. 2 is a front elevation of the trap on an enlarged scale unattached and showing it closed as it is after the entrance of a hen. Fig. 3 is a vertical longitudinal sectional view on the line 3—3, of Fig. 1, looking in the direction of the arrow. Fig. 4 is a similar view on the line 4—4, of Fig. 2; and Fig. 5 is a horizontal sectional view on the line 5—5, of Fig. 2.

Referring now to the drawing in which like characters of reference designate similar parts, 10 designates the main frame which comprises upper and lower bars 11 and 12 that are connected at the ends by side bars 13 and 14. This main frame is substantially square in contour and may be applied to the entrance opening of an ordinary nest in any preferred manner.

A pair of vertical parallel guide rods 15 and 16 are secured terminally in suitable openings formed in the inner edges of the upper and lower bars of the main frame, such guide rods being disposed in close proximity to the inner edges of the side bars of the main frame.

A slide bar 17 is provided near the ends with suitable openings to snugly receive bearing tubes 18 and 19 which loosely receive the guide rods 15 and 16 and permit of the slide bar sliding freely up and down on the guide rods.

A curtain 20 is secured at the upper edge to the inner edge of the upper bar 11 of the main frame by means of tacks 21 or otherwise, and is secured at the lower edge to the upper edge of the slide bar 17 by tacks 22 or otherwise, this curtain being sufficient in length to form a closure for the main frame when the slide bar is resting upon the lower bar 12 of the main frame when in dropped position. The curtain is preferably hemmed on the side edges as shown at 23 and 24 to prevent fraying, and equipped with rings 23′ and 24′ which encircle the rods 15 and 16.

For holding the curtain raised to permit of a hen entering the nest, I provide a substantially rightangular trigger 25 which is formed at the elbow with an eye 26 through which a securing pin 27 is passed, the pin being engaged in the front face of the upper bar of the main frame at substantially the center thereof. One end of the trigger is formed with an inwardly opening hook 28, and the opposite end is formed with a weight 29 that serves to normally hold the hooked end of the trigger rocked up as shown in Fig. 1. There is a pin 30 engaged in the front face of the slide bar 17 at substantially the center thereof, and this pin receives the hook 28 of the trigger when the slide bar is raised, it being understood that the operator swings down the trigger to effect this engagement.

As shown in Fig. 1, the trigger when engaged with the pin 30 holds the slide bar up and the curtain raised to permit of a hen entering the nest. Upon entering the nest the hen rubs against the slide bar with a resultant slight raising of the latter whereby the trigger is dislodged, and as the hen passes into the nest, the slide bar gravitates with a resultant dropping of the curtain behind her.

It is obvious that the entrapped hen cannot escape from the nest until the curtain is manually raised, and it is also obvious that a trap constructed as above described will afford ample ventilation and admit a subdued light, while at the same time will be devoid of projections of any character, and will further be devoid of large spaces through which the hen within the nest or a hen outside of the nest might thrust its head with resultant injury.

It will be further apparent that a trap constructed as above described is light, strong and durable and is formed of a few simple parts which will not easily get out of order.

What is claimed, is:—

1. A trap for nests including a main frame, parallel guide rods disposed within the inclosure of said frame, a gravitating slide bar secured to said guide rods, a curtain secured to said frame and to said slide bar, a rightangular trigger pivoted at the elbow on said frame above said slide bar and having a hook at one end and a weight at the opposite end whereby the hook is normally held rocked upwardly, and a pin carried by said slide bar, said hook being adapted to be rocked downwardly into engagement with said pin for yieldably holding said slide bar raised.

2. A trap for nests including a main frame, parallel guide rods carried within the inclosure of said frame, a slide bar having bearing tubes near the ends encircling said guide rods, a curtain secured to said frame and to said slide bar, a pivot pin disposed at substantially the center of the upper bar of said frame, a rightangular trigger having an eye at the elbow encircling said pin, said trigger being formed with a hook at one end, and with a counterbalancing weight at the opposite end serving to hold said hook rocked upwardly, and a pin disposed at substantially the center of said slide bar, said trigger being adapted to be manually rocked on said pivot pin until said hook engages with said pin whereby to yieldably hold said slide bar raised.

3. A trap for nests, including a main frame, parallel guide rods carried within the inclosure of said frame, a slide bar movable on said guide rods, a curtain secured to said frame and to said slide bar, rings connected to the sides of the curtain and encircling and slidingly mounted upon the guide rods, a pivot pin disposed at substantially the middle of the upper bar of said frame, a right angular trigger having an eye at the elbow encircling said pin, said trigger being formed with a hook at one end and provided at its opposite end with a counterbalancing weight serving to hold said hook rocked upwardly, and a pin disposed at substantially the center of said slide bar, said trigger being adapted to be manually rocked on said pivot pin until said hook engages with said pin, whereby to yieldably hold the slide bar raised.

4. A nest trap comprising a main frame, vertical guide elements secured to the frame, a gravitating bar movably connected to the guide elements, a curtain secured to said frame and to said bar, a right angular trigger pivotally connected at its elbow to the frame above said bar and having means on one end for engaging the bar and being provided with means at its other end for swinging it through an angle of approximately 90 degrees when released from its engagement with the bar.

In testimony whereof I hereunto affix my signature in the presence of two witnesses.

CHARLES LEWIS GRANT.

Witnesses:
L. ROESCHER,
R. M. SHERMAN.

Copies of this patent may be obtained for five cents each, by addressing the "Commissioner of Patents, Washington, D. C."